May 16, 1961 L. H. SHAFFER 2,984,696

SOLAR THERMOELECTRIC GENERATORS

Filed March 9, 1959 2 Sheets-Sheet 1

INVENTOR.
Lloyd Hamilton Shaffer by William A. Drucker
ATTORNEY.

May 16, 1961 L. H. SHAFFER 2,984,696

SOLAR THERMOELECTRIC GENERATORS

Filed March 9, 1959 2 Sheets-Sheet 2

*INVENTOR.*
Lloyd Hamilton Shaffer by William D. [illegible]
ATTORNEY.

2,984,696
Patented May 16, 1961

2,984,696

SOLAR THERMOELECTRIC GENERATORS

Lloyd Hamilton Shaffer, Stamford, Conn., assignor to American Machine & Foundry Company, a corporation of New Jersey Filed Mar. 9, 1959, Ser. No. 798,222
9 Claims. (Cl. 136—4)

This invention relates to electric generators and to conversion of solar energy into electrical energy by means of thermoelectric elements. In particular the invention relates to a device having a receiver adapted to collect and convert solar energy into heat and also having a plurality of thermocouples arranged to convert said heat into electrical energy. The invention also relates to apparatus for storing collected solar energy in the form of heat for subsequent conversion into electrical energy.

A known type of solar thermoelectric generator consists of a "flat plate" collector or receiver which is a non-focusing, solar energy absorbing device which converts such energy into heat. The plate is attached to the hot junction of a thermocouple to act as a receiver for the latter. A plurality of receivers and related thermocouples are arranged as a thermopile by assembling the components in a frame of convenient size. The thermocouples are connected in series or parallel and provided with terminals for connecting the thermopile to a load, such as a lighting circuit. If desired, a number of such units or thermopiles may be connected in series or parallel to furnish the desired amount of electrical energy.

An inherent disadvantage of the foregoing arrangement is that the individual receivers must be electrically insulated from each other to avoid shunting or short-circuiting between individual couples. This creates special insulating problems and requires the use of a holding and spacing template provided with suitable holes for the thermocouples and made of rigid insulating material.

Energy storage is another inherent difficulty in known types of generators. It has been proposed to accumulate electric energy in a storage battery to provide for night operation. However, the use of auxiliary storage batteries is cumbersome and uneconomical, and in view of the low efficiency of thermoelectric generators, it is desirable to keep the initial cost of such generators as low as possible consistent with maximum obtainable efficiency.

The present invention avoids the foregoing disadvantages of existing thermoelectric generators by arranging the hot junctions of a plurality of thermocouples adjacent to a single continuous flat plate receiver, thereby dispensing with the special holding and spacing template. The cold junction is formed by a transparent window. Where the junction with an electrical conductor is made, shorting of the thermocouples is prevented by inserting thin flakes or strips of dielectric material between the hot junctions of the thermocouples and the receiving plates and by using a cold junction window of dielectric material.

The apparatus of the present invention may also include improved and inexpensive energy storage means in the form of a heat reservoir arranged adjacent to the receiver plate, whereby solar energy is accumulated as heat for subsequent conversion into electrical energy as needed, for example, on cloudy days or at night.

This device can function in place of all or part of the roof of a building. The cold junctions of the thermocouples in this device are preferably oriented toward the sky or source of radiation rather than beneath the collector plate as in known devices.

The foregoing and other advantages of the invention as well as special features of construction, arrangement and combination of parts of the apparatus will appear more fully from the following description of several related embodiments thereof in connection with the accompanying drawing in which like reference characters designate similar or corresponding parts and wherein.

Figure 1:
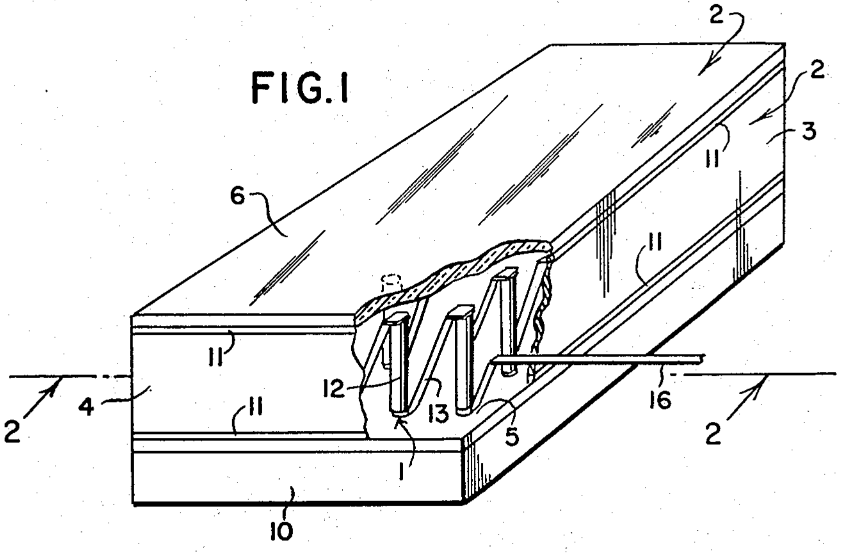
Fig. 1 is a perspective view of a thermoelectric generator made according to a preferred form of the invention, a portion being broken away for clarity.
Figure 2:
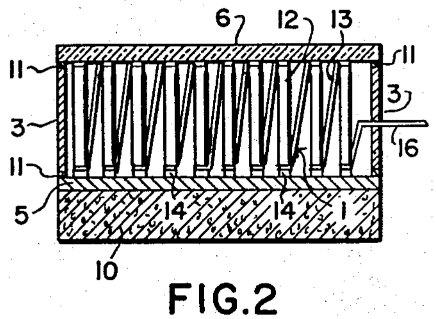
Fig. 2 is a transverse vertical section taken on the line 2—2 of Fig. 1.
Figure 3:
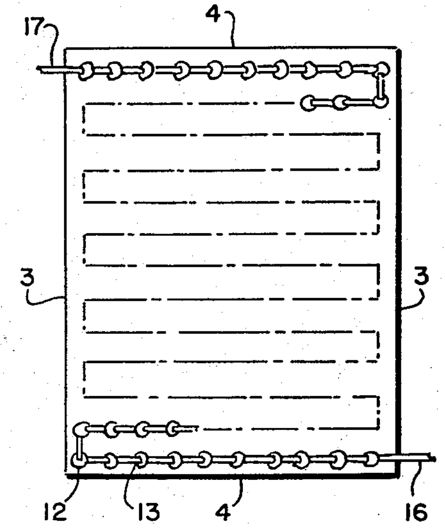
Fig. 3 is a schematic plan view of the device of Fig. 1 illustrating the interconnection of the thermocouples of the device.

Referring to Figs. 1, 2 and 3, the thermoelectric generator comprises a plurality of thermocouples 1 assembled in a chamber or housing 2 provided by side panels 3, 4, a bottom panel or receiver plate 5, which is a hot junction, and a transparent cover 6, which is a cold junction.

The side panels 3, 4 may be made of wood, for example, or equally rigid material which is preferably a poor heat conductor. The receiver plate 5 serves as the absorbing surface for solar radiation entering through the transparent cover 6. The plate 5 may be of metal blackened to increase heat absorption. In order to reduce losses due to radiation from the receiver plate, the blackened receiving surface should have such selective properties that for sunlight (wavelengths shorter than 2 microns) it is a poor reflector, while for thermal radiation at moderate temperatures (wavelengths longer than 2 microns) it is a good reflector and hence a poor emitter. Such a surface will reach a much higher temperature than an ordinary black surface when subjected to solar radiation. For a discussion of such receivers see J. Tabor, "Selective Radiation: I. Wavelength Discrimination," Bulletin: Research Council of Israel, Vol. 5A, pp. 119–128 (1956); also H. Tabor, "Solar Energy Research Program in the New Desert Research Institute in Beersheba," Solar Energy, Vol. 2, No. 1, pp. 3–6 (1958).

The transparent cover 6 is made of glass or clear plastic, for example, or any other material which is a high transmitter in the visible and near infrared region of the spectrum and preferably a low transmitter of wavelengths longer than 2 microns (infrared). This prevents some of the heat loss by radiation from the receiver plate 5. The cover window 6 acts as the cold junction of the thermocouples 1. In some cases it may be desirable to reduce heat lost by conduction through the cover by the use of a double window. The window or cover 6 may include spaced plates and a space between the plates evacuated or filled with an inert gas. Heat loss from the underside of the receiver 5 is reduced by insulation 10, which is adhered to receiver 5, and may be of glass wool, rock wool, cork or similar substances.

The side panels 3, 4 are sealed with respect to the cover 6 and the receiver 5 by gaskets 11, or by a low-melting solder or thermally resistant organic polymer cement which adheres to the cover 6 and the receiver 5.

Each thermocouple includes a pair of thermoelements 12, 13. The material from which the thermoelements are made should have the following characteristics for optimum thermoelectric efficiency: high thermoelectric power, low specific electrical resistance and low specific heat conductivity. Examples of thermoelectric materials useful as thermoelements are the heavy metal oxides and sulfides, e.g., ZnO and PbS, zinc-antimony and bismuth-antimony alloys and bismuth-tellurium alloys. These and other materials are described with tabulated properties in articles by Maria Telkes: "The Efficiency of Thermoelectric Generators," Journal of Applied Physics, Vol. 18, pp. 1116–1127 (1947); and "Solar Thermoelectric Generators," Journal of Applied Physics, Vol. 21, No. 6, pp. 767–777 (1954). The thermoelements may be made in any cross-sectional shape. For a discussion of the shape factor, see A. F. Ioffe, Semiconductor Thermoelements and Thermoelectric Cooling, Infosearch Ltd., London, 1957 (translated from Russian). The thermoelement 12 is, for example, a cylindrical ingot of bismuth-tellurium alloy ($Bi_2Te_3$) and the thermoelement 13 is, for example, a metal strip such as copper or aluminum.

The thermocouples are shown electrically connected in series, with the junction soldered for maximum efficiency. Production economies can be attained, however, by the use of pressure contacts. Where the receiver, 5, is an electrical conductor, thin dielectric material, resistant to heat degradation, such as flakes of mica or thermally resistant plastic strips such as polytetrafluoroethylene are inserted between the hot junctions of the thermocouples and the receiver to prevent shorting of the thermocouples. Preferably these materials should be thin enough to allow heat transfer, yet prevent electrical connection.

External terminals 16, 17, of the same material as the thermoelement 13, complete the generator assembly.

While the thermocouples are shown connected in series, suitable modifications can be made for parallel connection.

Figure 4:
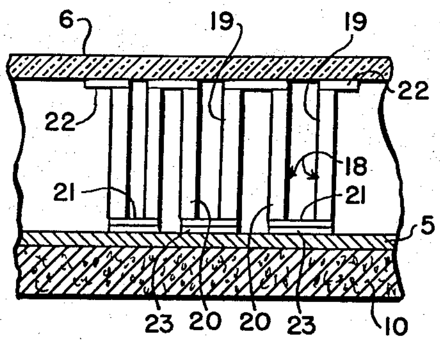
Fig. 4 is a fragmentary transverse section similar to that of Fig. 2 and showing a modified form of the invention.

Referring to Fig. 4, there is shown in fragmentary transverse section a plurality of thermocouples 18 of modified construction, the other portions of the generator being constructed as in the previous embodiment. Each thermocouple 18 includes electropositive 19 and electronegative 20 elements, connected by suitable connectors 21, such as copper strips, to form the hot junctions adjacent to the receiver 5. Similar conductors 22 serve for series connections between the thermocouples. Thin flakes or strips of suitable dielectric material 23, interposed between the hot junctions of the thermocouples and the receiver 5, prevent shorting of the thermocouples when the receiver is an electrical conductor. The thermoelements 19 and 20 may be made of bismuth-tellurium alloy ($Bi_2Te_3$) with varying traces of other elements to render each alloy either electrically positive or negative.

A novel and advantageous feature of the solar thermoelectric generator of the present invention is the provision of integral heat storage means whereby solar radiation may be stored for conversion into electric energy during times when sunlight is not available.

Figure 5:
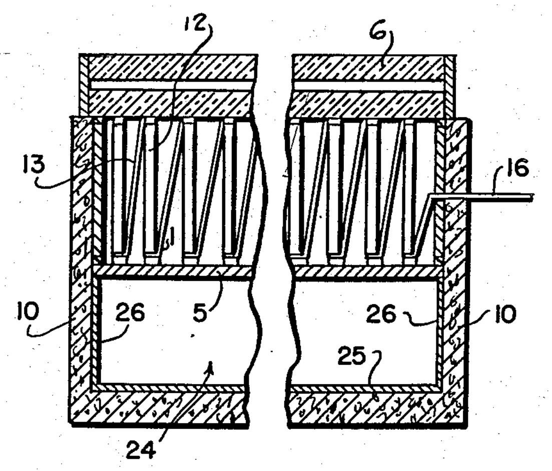
Fig. 5 is a transverse section through a thermoelectric generator with an integral heat storage reservoir.

In a preferred form of the invention the generator is constructed and arranged substantially as shown in the embodiment of Figs. 1, 2 and 3. In addition, as shown in Fig. 5, a heat storage reservoir 24 is provided preferably beneath the receiver 5, the walls of the reservoir being defined by said receiver 5 and the bottom 25 and side panels 26. The insulation 10 is shown as extending around all sides of the generator-reservoir, leaving only the cover 6 exposed to the atmosphere. The reservoir 24 may contain water, a saline solution, a gravel bed or any other substance having suitable heat capacity.

In operation, the reservoir 24 is heated during sunlit portions of the day, and at other times, as at night, gradually gives up its heat to the thermocouples 1 through the receiver 5. The ends of the thermocouples adjacent to the cover 6 are at about ambient temperature, and the whole assembly functions as a battery at such times as there is no solar radiation going into the generator. The period of operation as a battery is determined by the volume of the reservoir and the nature of the material contained therein and may extend for several hours. In addition to sunlight, heat may be added to the reservoir by other means such as application of heated materials or a flame.

In practice a solar energy thermoelectric generator plant comprises a plurality of collector-converter (generator) units, with or without heat storage reservoirs, electrically coupled in series or parallel. The overall size of each unit, the dimensions of the parts thereof and the spacing of the couples in each unit are governed by practical design considerations, such as edge heat losses, ease and convenience in handling and the sizes of sheet material available for the wall panels and the receiver and cover plates. The lateral spacing of the thermocouples is not critical and may vary, for example, from 1/4" to 18". A desirable spacing is between three and ten inches. The generator units can be made at least as large as fifty square feet in area, if desired.

The space between the cover 6 and the receiver 5 should be hermetically sealed to exclude dirt, moisture and other harmful components of the atmosphere, and in consideration of this it may be desirable to evacuate this space, utilizing the individual thermocouples as the cover supports. This serves as a convenient way of making the pressure contacts between the thermoelements. Also, convection-conduction losses from the receiver through the space between the cover and receiver are substantially eliminated. The distance between the cover 6 and the receiver 5 should be reduced as much as possible consistent with efficient thermocouple design. The space between the receiver 5 and the cover 6 may be filled with dry air or inert gas.

A typical thermoelectric generator is constructed to the following specifications: 14" by 18" in plan dimension; thermocouples of bismuth telluride arranged in 13 rows of 10 couples each at a spacing of approximately 1 1/4". Each couple will nominally develop 200 microvolts per ° C., and when the unit is operated at a temperature difference of about 50° C., it should deliver about two watts of electric energy per 115 watts of heat energy delivered to the hot junctions of the thermocouples.

The embodiments of the invention in which an exclusive property or privilege is claimed are defined as follows:

1. A solar thermoelectric generator, having interior and exterior surfaces, comprising in combination a flat plate receiver, having an inner and an outer face, adapted to be exposed to solar radiation and to be heated thereby, a transparent cover arranged in spaced relation to said receiver, a support, comprising side wall elements, extending between said receiver and said cover, a plurality of thermocouples disposed between said receiver and said cover with hot junctions of said thermocouples in thermal contact with said receiver and cold junctions of said thermocouples in thermal contact with said cover, means for intercoupling said thermocouples to form an electric circuit and electrical terminals extending from said circuit.

2. A generator according to claim 1, wherein the thermocouples are series connected.

3. A generator according to claim 1, wherein the receiver is an electrical conductor and the hot junctions of the thermocouples are electrically insulated from the flat plate receiver by strips of dielectric material disposed between said junctions and said receiver.

4. A generator according to claim 1, wherein the space between the cover and the receiver is sealed and evacuated.

5. A generator according to claim 1, wherein the outer face of the receiver is thermally insulated.

6. A generator according to claim 1, in which the cover comprises a pair of spaced transparent plates with the space therebetween being evacuated.

7. A generator according to claim 1, including a heat storage reservoir adjacent to the outer face of the receiver.

8. A generator according to claim 1, wherein a heat storage reservoir is juxtaposed to said receiver.

9. A generator according to claim 8, wherein the exterior surfaces of the generator and the reservoir are thermally insulated.

References Cited in the file of this patent

UNITED STATES PATENTS

| | | |
|---|---|---|
| 608,755 | Cottle | Aug. 9, 1898 |
| 1,077,219 | Coblentz | Oct. 28, 1913 |